United States Patent Office 3,470,257
Patented Sept. 30, 1969

3,470,257
ALKYLATION OF AROMATIC COMPOUNDS
Allen K. Sparks, Des Plaines, Ill., assignor to Universal Oil Products Company, Des Plaines, Ill., a corporation of Delaware
No Drawing. Continuation-in-part of application Ser. No. 523,919, Feb. 1, 1966. This application Dec. 19, 1966, Ser. No. 602,565
Int. Cl. C07c 43/20
U.S. Cl. 260—613         12 Claims

ABSTRACT OF THE DISCLOSURE

Alkylating an aromatic compound with an alkylating agent in contact with a catalyst comprising silica-metal oxide and alkali metal or alkaline metal component.

CROSS-REFERENCE TO RELATED APPLICATION

This application is a continuation-in-part of application Ser. No. 523,919, filed Feb. 1, 1966, and now abandoned.

SPECIFICATIONS

More particularly the present invention relates to an improvement in the alkylation of aromatic compounds in order to produce higher yields of desired products.

While the novel process of the present invention may be used for the alkylation of benzene, naphthalene, anthracene, etc., it is of particular advantage for use in the alkylation of an aromatic compound containing one or more substituents attached to the nucleus. This advantage appears in the production of higher yields of the desired isomer of the alkylated products which, as readily can be seen, is determined with relation to the other substituent or substituents attached to the aromatic nucleus. In one embodiment, the substituents on the aromatic nucleus may be hydrocarbon including alkyl, alkaryl, aryl, aralkyl, cycloalkyl, etc. Illustrative but not limiting examples of such substituted aromatic compounds include toluene, ethylbenzene, propylbenzene, butylbenzene, pentylbenzene, hexylbenzene, heptylbenzene, octylbenzene, nonylbenzene, decylbenzene, etc., xylene, methylethylbenzene, diethylbenzene, methylpropylbenzene, dipropylbenzene, methylbutylbenzene, ethylbutylbenzene, propylbutylbenzene, dibutylbenzene and other di-substituted benzenes containing one or more alkyl groups having 1 or more alkyl groups containing up to about twenty carbon atoms each. It is understood that similarly substituted naphthalenes, anthracenes, etc. may be alkylated in the present invention. The above examples include aromatic compounds having alkyl substituents. It is understood that one or more of the substituents may comprise the other hydrocarbon groups hereinabove set forth. Illustrative but not limiting examples of such substituted aromatic compounds include diphenyl, acenaphthene, indene, fluorene, phenanthrene, fluoranthene, pyrene, chrysene, styrene, allylbenzene, stilbene, diphenylalkanes, triphenylalkanes, tetraphenylalkanes, polyphenylsulfides, polyphenylethers, etc. and aromatic compounds containing other hydrocarbon substituents attached to one or more of the aromatic nuclei. It is understood that these are merely illustrative examples and that other aromatic compounds containing one or more hydrocarbon constituents may be alkylated in accordance with the present invention.

In a preferred embodiment, the aromatic compound contains at least one non-hydrocarbon substituent selected from those containing oxygen, sulfur, selenium, phosphorus, etc. Preferred examples in this embodiment comprise aromatic compounds having a substituent containing oxygen and illustrated by phenol, alkylphenols, dihydricphenols including catechol, resorcinol, hydroquinone, etc.

In a particularly preferred embodiment the present invention is directed to the alkylation of hydroxyanisole and more specifically p-hydroxyanisole. A very effective antioxidant for animal and vegetable fats and oils is 3-tert-butyl 4-hydroxyanisole and is prepared by the alkylation of p-hydroxyanisole with isobutylene, tert-butanol or other alkylating agent. An effective catalyst for this reaction is a composite of silica and a metal oxide. While this catalyst does produce high yields of the desired 3-alkyl isomer, it still is desired to even further increase the yields of the 3-butyl isomer and reduce the yields of the 2-alkyl isomer. This is accomplished in accordance with the present invention which utilizes a novel catalyst for this reaction. Another advantage to the use of the catalyst in the present invention is that a higher yield of the desired isomer is obtained initially and does not necessitate the extremely long break-in period which is required by the prior catalysts.

While the present invention is particularly advantageous for use in the alkylation of hydroxyanisole, it is understood that it also is used for the alkylation of other alkoxy phenols in which the alkoxy group contains from 2 to 10 or more carbon atoms. Also illustrative are compounds in which the hydroxy group is replaced by a mercapto group and/or the alkoxy group is replaced by a thioalkoxy group.

The catalyst for use in the present invention is a composite of silica and a metal oxide containing an alkaline component selected from alkali metals or alkaline earth metals. The silica generally comprises a major portion of the catalyst composite and may range from 50 to 98% thereof and preferably from about 60 to about 90% by weight. A particularly preferred metal oxide is alumina, which may comprise from about 2–50% and preferably from about 5 to about 40% by weight of the catalyst composite. Other silica-metal oxide composites include silica composited with one or more of magnesium, zirconium, thorium, titanium, molybdenum, tungsten, manganese, etc. The silica-metal oxide composite may be synthetically prepared or it may comprise naturally-occurring materials as, for example, aluminum silicates such as Filtrol, Tonsil, etc.

The silica-metal oxide composite preferably is prepared first and this may be accomplished by separate, successive or co-precipitation methods. For example, a suitable acid, such as sulfuric acid, is reacted with sodium silicate solution, such as water glass, to form silica gel. When spherical catalysts are desired, the mixture of acid and water glass are dropped through a suitable orifice or onto a rotating disk into a suitable suspending medium, such as mineral seal oil, Nujol, etc. and maintained therein until the silica gel sets into firm spheres. Usually the spheres are transferred from the forming zone by means of a layer of water disposed beneath the oil layer, and the spheres are washed to remove alkali metal ions. The spheres then are composited with alumina by suspending the same in a suitable aluminum salt solution such as that of aluminum chloride, aluminum nitrate, aluminum sulfate, etc., aluminum hydroxide being precipitated by the addition of a suitable basic reagent, after which the composite is dried at a temperature of from about 200° to about 500° F. and calcined at a temperature of from about 800° F. to about 1200° F.

In accordance with the present invention, the silica-metal oxide composite then is commingled with an alkaline component selected from alkali metals and alkaline earth metals. In a particularly preferred embodiment, the alkali metal is lithium. Other alkali-metal components include sodium, potassium, rubidium and/or cesium. The alkaline earth metal components include beryllium, magnesium, calcium, strontium and/or barium. It is understood that mixtures of these may be used.

The alkaline component may be composited with the silica-metal oxide in any suitable manner. Conveniently, this is accomplished by utilizing a compound and preferably a water soluble compound of the alkaline material which upon heating will incorporate the alkaline component into the composite. A particularly preferred compound of lithium is lithium nitrate. The silica-alumina particles may be soaked or suspended in a solution of lithium nitrate or the lithium nitrate solution may be poured over or otherwise contacted with the silica-metal oxide particles. Excess solution is drained and/or evaporated off and the particles then are calcined in the presence or absence of oxygen, at a temperature of from about 400 to about 1500° F. or more. It is understood that other suitable compounds of lithium or of the other alkaline earth metals may be used and that the final composite may be formed into any desired size and shape in any suitable manner. Other soluble lithium compounds include lithium chloride, lithium formate, lithium nitrite, lithium sulfate, etc. The alkaline component may be present in the final catalyst as the free element, but more likely is present as a chemical compound or in chemical association with one or more of the other components of the catalyst. The amount of alkaline component generally will be in the range of about 0.01 to about 10% by weight and preferably from about 0.05 to about 2% by weight of the final catalyst.

While it generally is preferred to prepare the silica-metal oxide composite first and then incorporate the alkaline component, it is understood that modifications may be used in which the alkaline component is composited first with the silica or metal oxide and then composited with the remaining components of the catalyst. Also it is understood that the final catalyst may be in the form of spheres, extrudates, pills, tablets, powders, etc. and that these may be formed in any well-known manner.

After preparing the catalyst composite containing the alkaline component, the catalyst composite may be hydrated prior to use. This may be accomplished by soaking the catalyst particles in water at a temperature from about ambient to 190° F. for a time of 15 minutes to 10 hours or more. Excess water may be drained and the catalyst used as such. However, when desired, the catalyst may be partly dried by heating at a temperature of from about 100 to 200° F. for a period of from 5 to 30 minutes. In another embodiment, and prior to hydration of the catalyst, the catalyst composite may be treated with steam at a temperature of from about 500° to about 900° F. for a period of from 0.5 to 20 hours or more.

The alkylation reaction may be effected in either batch or continuous flow process. In a batch type operation, the reactants and catalyst are introduced into a reaction zone equipped with stirring or other suitable means for effecting intimate contact of the catalyst and reactants. The desired heating may be applied to the reactants and/or reaction zone by well-known means. In a continuous type operation, when employing a solid catalyst, the catalyst is disposed in the reaction zone and the reactants, at the desired temperature, are passed into contact with the catalyst in either upward or downward flow. Another type of operation is the suspensoid type of operation in which the catalyst is carried into the reaction zone by means of one or more of the reactants or by means of an inert carrying medium. Another type of operation includes the fluidized type process in which the reactants and catalyst are maintained in a state of turbulence under hindered settling conditions in the reaction zone. The pressure to be employed will depend upon the type of operation to be utilized and will vary from atmospheric to 1000 pounds or more per square inch. The temperature may range from about 200° to about 400° F. and generally from about 250° to about 250° F.

Any suitable alkylating agent is used. In one embodiment it comprises an olefin including particularly ethylene, propylene, butylene, amylene, hexylene, etc. and in another embodiment it comprises an alcohol including ethanol, propanol, butanol, pentanol, hexanol, etc. In still another embodiment the alkylating agent may comprise an alky halide and particularly methyl chloride, ethyl chloride, propyl chloride, butyl chloride, pentyl chloride, hexyl chloride, etc. When a tertiary alkl configuration is desired, the olefine used is a tertiary olefin, the alcohol is a tertiary alkanol and the halogen is a tertiary alkyl halide.

The aromatic compound will be used in a mole ratio to alkylating agent of at least 1:1 but preferably is used in excess and thus will range from 2:10 or more moles of aromatic compound per mole of alkylating agent.

When desired, water may be introduced along with the charge to the catalyst zone. The amount of water will range from about 0.1 to about 100% of the combined aromatic compound and alkylating agent but preferably is within the range of from about 1% to about 10% thereof.

As hereinbefore set forth the novel process of the present invention produces higher yields of the desired isomer. This will vary with the particular reactants employed. As a particular advantage to the use of the novel catalyst in the present invention, the higher yield of the desired isomer starts to occur in the initial stages of the reaction and does not require the long break-in period required with other catalysts.

The product from the alkylation reaction may be treated in any suitable manner such as by fractionation, solvent extraction, etc. to separate unreacted hydroxyanisole, which is recycled to the reaction zone for further conversion therein, and the desired 3-tertiary-alkyl-p-hydroxyanisole. While high yields of the desired isomer is obtained, some 2-tertiary alkyl-p-hydroxyanisole and some dialkyl-p-hydroxyanisole are produced. However, when effecting the alkylation in accordance with the present invention, the yields of the desired 3-alkyl isomer is increased and the yields of the undesired 2-alkyl isomer and of the dialkyl products are lower than heretofore obtainable.

The following examples are introduced to illustrate further the novelty and utility of the present invention but not with the intention of unduly limiting the same.

EXAMPLE I

The catalyst used in this example was a composite of 75% by weight silica, 25% by weight of alumina and 0.1% by weight of lithium. The silica-alumina composite was prepared by the general steps of acidifying water glass, washing, drying, and then commingling aluminum chloride therewith and precipitating with ammonium hydroxide, after which the composite was dried at about 400° F. and calcined at about 1100° F. The resulting powder was formed into pills of ⅛″ by ⅛″. The pills then were soaked in an aqueous solution of lithium nitrate in a concentration to form a final composite containing 0.1% by weight of lithium. The catalyst composite was calcined in the presence of oxygen at 1000° F. for about 2 hours. The catalyst was steamed at about 800° F. for 12 hours and then was pre-hydrated by being soaked in water for ½ hour, after which the excess water was drained off and the catalyst was used for the alkylation. This catalyst had a bulk density of 0.54 gram per cc.

The catalyst prepared in the above manner was utilized for the alkylation of p-hydroxyanisole with tert-butyl alcohol by being passed upwardly through a bed of the catalyst at a temperature of about 285° F. and a pressure of about 125 p.s.i., using a mole ratio of p-hydroxyanisole to tert-butyl alcohol of 10:1. The reaction products were analyzed by G.L.C. and, based upon the alkylated products, contained 90.4% of 3-tert-butyl-4-hydroxyanisole, 7.8% of 2-tert-butyl-4-hydroxyanisole, and 1.8% of 2,5-di-tert-butyl-4-hydroxyanisole.

For comparative purposes, the silica-alumina composite without the addition of lithium was used for alkylation in the same manner as described above. The alkylated products contained 86.6% of 3-tert-butyl-p-hydroxyanisole, 9.9% of 2-tert-butyl-p-hydroxyanisole and 3.5% of di-tert-butyl-p-hydroxyanisole.

In comparing the results of these two runs, it will be noted that the catalyst containing lithium produced about 4% more of the desired 3-butyl isomer, about 2% less of the undesired 2-butyl isomer and about ½ as much of the dialkylated product. When considered from a commercial viewpoint in a plant handling large volumes of reactants, this increase of almost 4% in the desired product is of substantial importance.

EXAMPLE II

Another run was made in susbtantially the same manner as described in Example I with the catalyst comprising silica, alumina and lithium but without pre-steaming of the catalyst. This yielded 89.8% of the desired 3-tert-butyl-p-hydroxyanisole, 7.6% of the 2-tert-butyl-p-hydroxyanisole and 2.6% of the di-tert-butyl-p-hydroxyanisole. It will be noted that this is a definite improvement compared to the run made with the catalyst not containing lithium, although not quite as good as the run in which the catalyst was steam treated prior to hydration.

EXAMPLE III

A catalyst was prepared in substantially the same manner as described in Example I except that it contained 0.05% by weight of lithium. When evaluated in the same manner as described in Example I, the alkylated product contained 89% 3-tert-butyl-p-hydroxyanisole, 8.7% 2-tert-butyl-p-hydroxyanisole and 2.3% of the di-tert-butyl-p-hydroxyanisole. Even with this small amount of lithium in the catalyst, a definite improvement is noted as compared to the results obtained when using the catalyst not containing lithium.

EXAMPLE IV

Another catalyst was prepared in substantially the same manner as described in Example I except that it contained 1% by weight of lithium. It was subjected to prehydration but not steaming. This catalyst had an apparent bulk density of 0.63 gram per cc. When used for the alkylation of p-hydroxyanisole with tertiary-butyl alcohol in the same manner as described in Example I, the alkylated products comprise 95.8% of 3-tert-butyl-p-hydroxyanisole and 4.2% of 2-tert-butyl-p-hydroxyanisole. Substantially no 2,5-di-tert-butyl-p-hydroxyanisole was produced. It will be seen that this catalyst was outstanding in producing extremely high yields of the desired 3-butyl isomer and very low yields of undesired products.

EXAMPLE V

Another catalyst was prepared in the same manner as described in Example IV except that it was not subjected to steaming or pre-hydration. When evaluated in the same manner as described in Example I, the alkylated product contained 94.2% of 3-tert-butl-p-hydroxyanisole and 5.8% of 2-tert-butyl-p-hydroxyanisole but did not contain any di-tert-butyl-p-hydroxyanisole. Here again the advantages of the catalyst containing lithium are demonstrated.

EXAMPLE VI

The catalyst of this invention comprises 60% by weight of silica, 39% by weight of alumina and 1% by weight of calcium. The catalyst is prepared by commingling silica, alumina and calcium oxide in the proper proportions to produce a catalyst having the composition set forth above. The oxides are mixed in a ball mill, dried at 280° F. and formed into granules of 1/16" to ¼" in diameter. The granules are washed, dried at 300° F. and calcined at 1000° F. The catalyst granules then are hydrated by being soaked in water for ½ hour, and the excess water drained off.

The catalyst prepared in the above manner is used for the alkylation of p-methyl-thiophenol with isobutylene to form high yields of the desired butylated product.

EXAMPLE VII

A commercial cracking catalyst comprises 88% by weight of silica and 12% by weight of alumina. Particles of this catalyst are soaked in an aqueous solution of strontium chloride hexahydrate, excess solution drained off and the catalyst calcined at 1000° F. to form a final catalyst containing 1.5% by weight of strontium.

The catalyst prepared in the above manner is utilized for the alkylation of meta-cresol with 2-methylbutene to form high yields of the desired alkylated product.

I claim as my invention:

1. A process for the alkylation of a phenolic compound selected from the group consisting of phenol and p-hydroxyanisole which comprises reacting said phenolic compound with an alkylating agent selected from the group consisting of t-butyl alcohol and isobutylene at a temperature of from about 200° F. to about 400° F. in contact with a catalyst consisting essentially of silica, alumina and from about 0.05% to about 10% by weight of a metallic component selected from the group consisting of the alkali metals and calcium, the silica being present in an amount of from about 60% to about 90% by weight and the alumina being present in an amount of from about 5% to about 40% by weight.

2. The process of claim 1 wherein said metallic component is sodium.

3. The process of claim 1 wherein said metallic component is potassium.

4. The process of claim 1 wherein said metallic component is lithium.

5. The process of claim 1 wherein said catalyst is treated with steam prior to use in said alkylation.

6. The process of claim 1 wherein said catalyst is hydrated prior to use in said alkylation.

7. A process for the alkylation of p-hydroxyanisole which comprises reacting p-hydroxyanisole with t-butyl alcohol at a temperature of from about 200° F. to about 400° F. in contact with a catalyst consisting essentially of silica, alumina and from about 0.05% to about 10% by weight of a metallic component selected from the group consisting of the alkali metals and calcium the silica being present in an amount of from about 60% to about 90% by weight and the alumina being present in an amount of from about 5% to about 40% by weight.

8. The process of claim 7 wherein said catalyst is treated with steam prior to use in said alkylation.

9. The process of claim 7 wherein said catalyst is hydrated prior to use in said alkylation.

10. The process of claim 7 wherein said reaction temperature is maintained within the range of from about 250° F. to about 350° F.

11. The process of claim 7 wherein said metallic component is lithium.

12. The process of claim 11 wherein the lithium is present in an amount of from about 0.05% to about 2% by weight.

References Cited

UNITED STATES PATENTS

| | | | |
|---|---|---|---|
| 2,435,087 | 1/1948 | Luten et al. | 260—621 |
| 2,470,902 | 5/1949 | Rosenwald | 260—613 |
| 2,623,911 | 12/1952 | Corson et al. | |
| 2,843,634 | 7/1958 | Prutton | 260—612 |

BERNARD HELFIN, Primary Examiner

U.S. Cl. X.R.

260—609, 624